United States Patent
Laguarta Bertran et al.

(10) Patent No.: US 7,636,167 B2
(45) Date of Patent: Dec. 22, 2009

(54) DUAL TECHNOLOGY OPTICAL PROFILOMETER

(75) Inventors: Ferran Laguarta Bertran, Barcelona (ES); Roger Artigas Pursals, Barcelona (ES); Cristina Cadevall Artigues, Barcelona (ES)

(73) Assignee: Universitat Politecnica De Catalunya, Barbera del Valles (ES)

( * ) Notice: Subject to any disclaimer, the term of this patent is extended or adjusted under 35 U.S.C. 154(b) by 29 days.

(21) Appl. No.: 11/587,090

(22) PCT Filed: Apr. 20, 2005

(86) PCT No.: PCT/ES2005/000204

§ 371 (c)(1),
(2), (4) Date: Oct. 20, 2006

(87) PCT Pub. No.: WO2005/103790

PCT Pub. Date: Nov. 3, 2005

(65) Prior Publication Data
US 2007/0165241 A1    Jul. 19, 2007

(30) Foreign Application Priority Data
Apr. 23, 2004    (ES) ................ 200401071

(51) Int. Cl.
*G01B 11/02*    (2006.01)
(52) U.S. Cl. ............................... 356/511
(58) Field of Classification Search ........ 356/479, 356/497, 511–516, 72, 73
See application file for complete search history.

(56) References Cited

U.S. PATENT DOCUMENTS

| | | | | |
|---|---|---|---|---|
| 6,525,816 | B2 * | 2/2003 | Aastuen et al. | 356/364 |
| 6,570,143 | B1 * | 5/2003 | Neil et al. | 250/201.9 |
| 7,236,251 | B2 * | 6/2007 | Takaoka | 356/497 |
| 2001/0042837 | A1 * | 11/2001 | Hoffmann | 250/458.1 |
| 2003/0030817 | A1 * | 2/2003 | Lee et al. | 356/491 |
| 2003/0122091 | A1 * | 7/2003 | Almogy | 250/492.24 |
| 2006/0192978 | A1 * | 8/2006 | Laguarta Bertran et al. | 356/601 |
| 2007/0279639 | A1 * | 12/2007 | Hu et al. | 356/512 |

FOREIGN PATENT DOCUMENTS

WO    WO 01/42735 A1    6/2001

OTHER PUBLICATIONS

Roger Artigas et al., Three-dimensional Micromeasurements On Smooth And Rough Surfaces With A New Confocal Optical Profiler, Part of the Europto Conference on Optical Measurement Systems for Industrial Inspection, Jun. 1999, SPIE vol. 3824, Munich, Germany. (XP-002334081).

(Continued)

*Primary Examiner*—Tarifur Chowdhury
*Assistant Examiner*—Jonathan M Hansen
(74) *Attorney, Agent, or Firm*—Blank Rome LLP

(57) ABSTRACT

The device comprises a light source (LED), beam splitters, illumination pattern generating mechanism and interchangeable microscope lenses that are lenses that may be used to obtain confocal images and lenses that may be used to obtain interferometric images. The generating mechanism can generate a sequence of illumination patterns to obtain confocal images, or total opening of all the illumination pixels to obtain interferometric images.

9 Claims, 1 Drawing Sheet

OTHER PUBLICATIONS

Adrian G. Podoleanu et al., Sequential Optical Coherence Tomography and Confocal Imaging, Optics Letters, © 2004 Optical Society of America, Feb. 15, 2004, vol. 29, No. 4. (XP-002334082).

Roger Artigas et al., Dual-technology Optical Sensor Head for 3D Surface Shape Measurements on the Micro and Nano-Scales, Optical Metrology In Production Engineering, Proc of SPIE, 2004, vol. 5457, Bellingham, WA. (XP-002334080).

Written Opinion of the International Searching Authority, dated Jul. 14, 2005.

International Search Report, dated Jul. 14, 2005.

Cadevall, Cristina et al., "Improving the Measurement of Thick and Thin Films with Optical Profiling Techniques", Proceedings SPIE, vol. 6616, pp. 66161Z-1-661612-12 (2007).

Cadevall, Cristina, "Chapter 3—New Optical Imagining Profiler: Design and Applications", PhD Supervisors: F. Laguarta and R. Artigas, PhD Degree awarded by Technical University of Catalonia (UPC) Mar. 26, 2007.

* cited by examiner

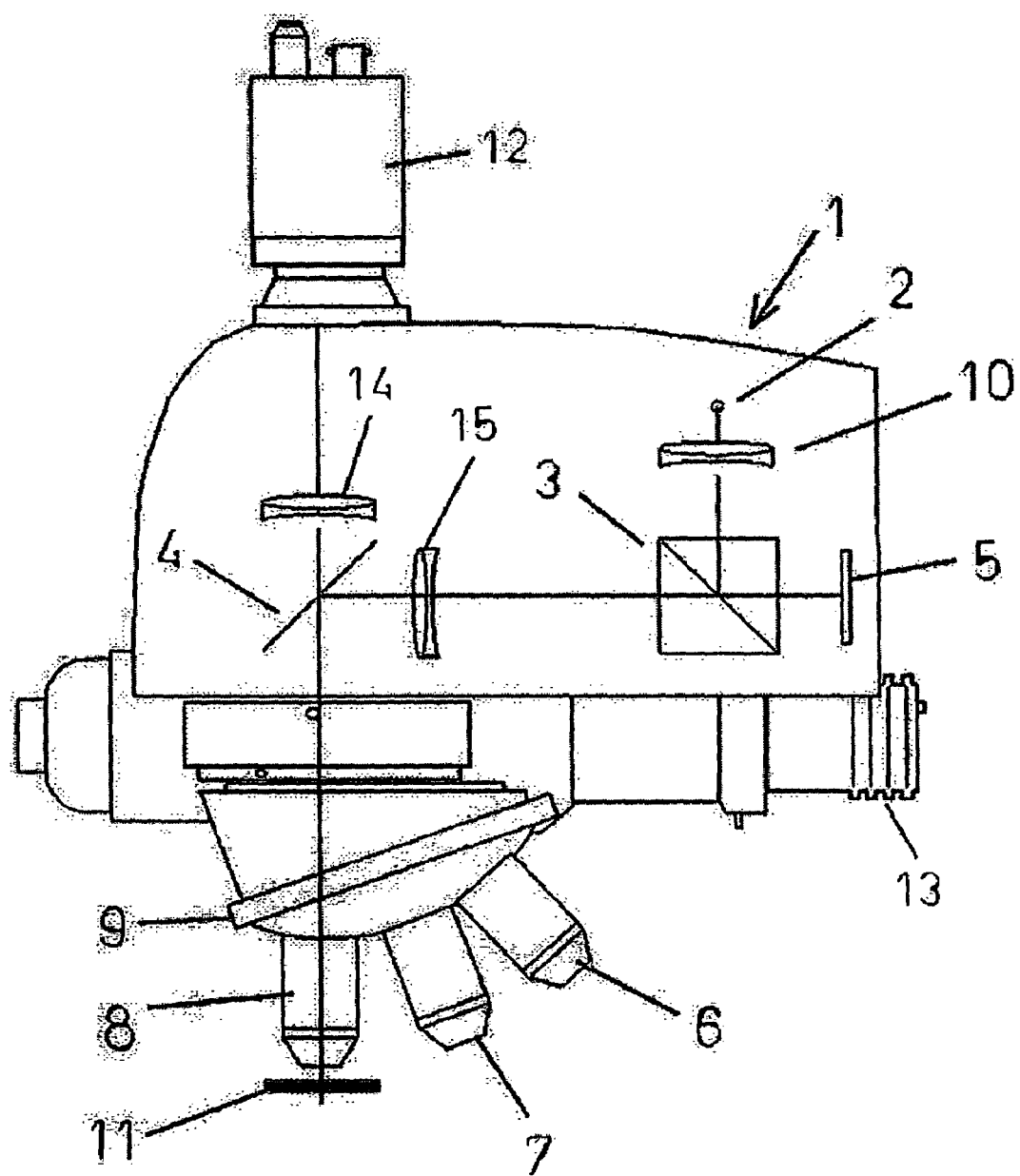

DUAL TECHNOLOGY OPTICAL PROFILOMETER

FIELD OF THE INVENTION

The present invention relates to a dual (confocal and interferometric) technology optical profilometer for the three-dimensional inspection and measurement of surfaces.

This invention pertains to the technical sector of optical metrology, i.e., in which there is no physical contact between the measurement device and the sample being analysed.

BACKGROUND OF THE INVENTION

There are countless applications that require knowledge of the topography of the surface of an object and thus determination of its microscopic shape. Such analysis may, for example, form part of a quality control process.

The introduction of new applications for materials and new manufacturing processes is resulting in a systematic increase in the market demand for processes for the inspection of surfaces and for the development of optical profilometers.

In this connection, there are at present two technologies based on image formation that have competed fiercely in recent years to dominate the optical surface metrology market.

Both the confocal technique and the interferometric technique are able to measure surface topography precisely and reliably on the micrometric and nanometric scales.

Nevertheless, as explained below, the measurement principles involved in the confocal technique and the interferometric technique are very different, and consequently the capacities of the two techniques are more complementary than coincident.

Confocal Profilometry.

Confocal profilometers allow height measurement of surfaces with a wide range of textures (from very rough surfaces to very smooth ones) by scanning the sample vertically in steps so that each point on the surface passes through the focus. The height of the surface at each point is established by detecting the position of the maximum value of the axial response. Since only one or a very small number of points on the surface are illuminated simultaneously, an in-plane scan must be carried out in order to build up the axial response, i.e. the confocal image, in each vertical step for all the points falling within the field of view of the lens used.

Examples of this type of profilometer are described, for example, in European patent EP0,485,803, which refers to an optical device that uses the path of a confocal beam with an illumination array and a detector array. The illumination array is imaged in a focal plane located on or in the vicinity of the surface of the object. The radiation reflected in the focal plane is sent directly, by means of a beam splitter, onto the receiver surface of a CCD device. The imaging of the illumination array on the receiver surface is performed so that the light-sensitive regions of the receiver act as confocal diaphragms. The signals from the elements of the detector that receive only light scattered outside the focal place are not taken, or are taken separately, into account in the evaluation.

U.S. Pat. No. 5,239,178 discloses a similar optical device in which an illumination grid and a detector grid are provided in a confocal arrangement in relation to an object. The illumination grid may have a variable grid size formed, for example, of a grid of LEDs.

Interferometric Profilometry.

In this case a beam of light passes through a beam splitter. One part of the beam is sent to the surface of the sample and the other part is sent to a reference mirror. The light reflected from these surfaces is recombined and forms a pattern of interference fringes.

Interferometric profilometry makes use of phase shift interferometry (PSI) that allows measurement of the topography of very smooth surfaces with subnanometric resolution. The sample, which must be placed at the focus, is scanned vertically in steps that are a highly precise fraction of the wavelength. Profiling algorithms produce a phase map of the surface, which is converted into the corresponding height map by means of the suitable unwrapping procedure.

Interferometric profilometers also use vertical scanning interferometry (VSI) with white light to measure the topography of smooth or moderately rough surfaces. Maximum contrast of the interference fringes occurs at the best position of the focus for each point on the surface of the sample. The sample is scanned vertically in steps so that each point on the surface passes through the focus. The height of the surface at each point is obtained by detecting the position of the maximum of the envelope of the interferogram.

Examples of this type of profilometer are described, for example, in U.S. Pat. No. 5,563,706, referring to an interferometric surface profilometer. The light reflected from a reference surface and a sample surface is sent to an imaging optical system through a beam splitter and interference fringe formed from light reflected from the both surfaces is observed with a detection optical system. An alignment optical member is disposed in an optical path between the imaging optical system and an image plane of the interference fringe, so that the rear focal point of the alignment optical element is located at the image plane.

For example, U.S. Pat. No. 6,665,075 describes an imaging system using a phase shift interferometer (PSI) and further including a transmitter, a beam splitter, a phase inverter and a receiver. The transmitter transmits a signal pulse that is split into a measurement pulse and a reference pulse. The measurement pulse is applied to a sample and a relative phase shift is introduced between the two pulses by the phase inverter, which are recombined to form a combined pulse that is detected by the receiver.

U.S. Pat. No. 6,636,317 provides that the beam splitter is arranged with a little inclination from the vertical to the incident light beam. In the optical interferometer described, the incident light beam is branched into two optical paths which cross at right angles by means of said beam splitter. In each optical path, the reflection light is totally reflected by a first reflection unit while transmission light is totally reflected by a second reflection unit. The reflection lights by both reflection units are wave-combined again by the beam splitter and received by a light receiver.

The above mentioned PSI and VSI interferometers can carry out very fast measurements on the micrometric and nanometric scales. In addition, there is no intrinsic limitation in the vertical measurement range with the VSI technique. Nevertheless, both techniques have the drawback that they cannot easily deal with highly inclined smooth surfaces or with structured samples containing dissimilar materials.

PSI devices allow users to carry out measurements of shape and texture even at scales lower than 0.1 nm. Nevertheless, they have the drawback of an extremely limited vertical measurement range.

Confocal profilometers based upon image formation as described above provide solutions to many of the difficulties involved in the interferometry technique and can even provide the best lateral resolution possible with an optical system. Nevertheless, they have a limited vertical resolution imposed by their numerical aperture value and do not allow attainment of repeatabilities on the order of 0.1 nm.

Confocal profilometers may be used with lenses with high magnification and numerical aperture, up to 150× and 0.95, respectively. On the other hand, the magnification possible with PSI and VSI devices is limited in practice to 50×. Higher magnification can be attained through the use of other types of lenses, by they are impractical and extremely expensive.

It is therefore desirable to have a profilometer that can provide representations of smooth or relatively rough surfaces with a certain degree of inclination to determine their shape, texture, etc. in samples of dissimilar materials with resolution on a subnanometric scale.

SUMMARY OF THE INVENTION

The present invention provides a new optical surface metrology device for non-physical contact surface measurements. It is a dual (confocal and interferometric) technology profilometer that combines in one device the advantages of both techniques, this device being of a compact size and containing no moving parts.

The profilometer of this invention may be used as a confocal profilometer or as an interferometric profilometer and is therefore useful for a wide range of applications and provides further advantages. Consequently, the dual technology optical profilometer of the invention provides all the features required for analysis of the surface of a sample and is suitable for carrying out repetitive and accurate measurements of very flat and smooth surfaces having aspect ratio on the nanometric range.

The profilometer of the invention can also be used to measure very rough surfaces with very high aspect ratio and a steep inclination. Height measurements can also be made of structured or stratified samples containing dissimilar materials and inclined surfaces, as indicated, using the same device.

The invention provides a dual (confocal and interferometric) optical profilometer comprising a light source including a light-emitting diode, beam splitters, a CCD device and number of interchangeable microscope lenses. These interchangeable microscope lenses comprise conventional lenses that may be used to obtain confocal images and interferometric lenses that may be used to obtain interferometric images. All of said interchangeable microscope lenses are mounted on a rotating element that allows them to be changed easily, depending on the desired type of profilometer function.

The profilometer of the invention is provided with illumination pattern generating means comprising a liquid crystal on silicon (LCOS) micro-display. The LCOS micro-display allows generation of a sequence of illumination patterns that provides, by means of application of the suitable algorithms, confocal images, or allows total opening of all the illumination pixels to obtain interferometric images. The profilometer is completed with a polarising beam splitter associated with said micro-display.

The light-emitting diode will preferably emit a spectrum of light with a coherence length ranging from 2 and 10 µm. This range allows applying both the interferometric profilometry technique of phase shifting (PSI) or the profilometry technique of vertical scanning with white light (VSI). The optimum range of values for the coherence length of the spectrum of light emitted is between 4 and 6 µm.

Lastly, the profilometer includes a scanning system to carry out the vertical scanning of the sample required so that all the points on the surface pass through the focus. This scanning is required for both confocal profilometry and interferometric profilometry (PSI and VSI).

The vertical scanning for measurement of the surface topography of the sample is carried out by means of a vertical scanning system which may be a motor-driven means or a piezoelectric-driven means (PZT). Both systems (motor or piezoelectric-driven means) may be controlled by means of open loop or preferably closed loop systems.

This simple structural configuration provides a non-contact measurement profilometer with a sturdy, compact design, which can be attached, for example, to the arm of a robot to carry out measurements in difficult positions, for example, in an inclined position, in process control procedures.

The dual (confocal and interferometric) nature of the profilometer of the invention allows it to operate as a confocal imaging and profiling device or as an interferometric imaging and profiling device for analysis of surfaces simply by selecting, on the device itself, the appropriate microscope lens by means of the rotating element on which the lenses are mounted.

*The profilometer of the invention is extremely versatile for carrying out accurate measurements of the shape and texture of all types of surfaces on the micrometric and nanometric scales, including structured or stratified samples containing dissimilar materials.

There are many applications in which the profiler of the invention may be used. By way of example, the profiler of the invention may be used for the measurement of high aspect ratio surfaces such as, for example, those containing grooves, holes or indentations, steeply sloped polished surfaces such as, for example, those of micro-optical structures as micro-lenses and micro-prisms or on-Si micro-finished surfaces, steeply rough and not very reflective surfaces such as, for example, paper, surfaces of very low roughness containing dissimilar materials such as, for example, optical or electronic microdevices, surfaces exhibiting different textures and relatively large sized surfaces such as, for example, a mould, a coin or a wafer, which can be measured with the option of field stitching, etc.

The dual operation of the profilometer of this invention is set out below.

In the confocal mode, the user selects a conventional microscope lens and activates an acquisition program associated with this mode. The light source (LED) emits a modulated beam of light that passes through a collimator and a polarising beam splitter (PBS). The light reflected by the PBS falls upon the LCOS micro-display and is reflected there with a polarisation that depends on the state assigned to each pixel for each illumination pattern represented. The light reflected by the LCOS passes once again through the PBS, where discrimination is made between the different polarisations, and an auxiliary optical system, and is reflected by another beam splitter to the microscope lens. The beam of light falls upon the surface of the sample to be measured, upon which the light pattern generated by the LCOS is projected. The light reflected or diffused on the surface of the sample passes once again through the microscope lens, the beam splitter and an auxiliary optical system (field lens), to fall upon the CCD device where the image of the surface of the sample in the focus at that time is projected.

In the confocal mode, only one or a small number of points on the surface of the sample are illuminated simultaneously by the illumination pattern represented on the LCOS micro-display and the axial response for each of these points is calculated using the appropriate algorithm. In order to cover all the points on the surface to be measured, a series of illumination patterns must be projected onto that surface to obtain the value of the axial response for all the points falling within the field of view. In this way, the confocal image is obtained for a specific vertical position, where the corresponding value of the axial response for each point will be higher the closer it is to the position of the focus. Thus, confocal images provide very high contrast, since light is only perceived in the areas near the focus, while the areas at a distance from the focus appear as dark.

Measurement of the topography of a surface requires a sequence of confocal images in different planes of the sample located at different heights. On the basis of these images and using the appropriate software, a three-dimensional reconstruction of the surface is obtained. In order to obtain this sequence of images, a system for vertical scanning of the sample is required.

In the confocal mode described, the profilometer can carry out measurements with an extraordinary lateral resolution. This makes it possible to reduce spatial sampling to values of 0.10 µm for a conventional 150× lens, making it ideal for measurement of critical dimensions on the nanometric scale. In this mode, lenses with a large numerical aperture (NA) may be used, allowing measurement of polished surfaces with very high slopes (up to 70°). It is also possible to use lenses with super-large working distances (SLWD), allowing measurement of surfaces with high aspect ratio. In all cases, structured samples containing dissimilar materials can also be measured.

In the interferometric mode, the user selects an interferometric microscope lens, and the acquisition program associated with the lens is also activated. In contrast with the confocal mode, the micro-display has all its pixels open to illuminate the whole surface to be analysed at once. In other words, in the interferometric mode, illumination patterns are not projected, but instead the whole surface is illuminated to obtain interferometric images for each plane of analysis. The beam emitted is passed through the splitter, which sends all the light to the surface of the sample, and the image of the surface is projected onto the CCD device. The series of interferometric images resulting from the vertical scanning of the sample provides, by means of the appropriate algorithm, the surface topography of the sample being analysed.

In this mode, the PSI technique may be used to measure continuous and very smooth surfaces with subnanometric vertical repeatability, regardless of the interferometric lens used, in other words, for all values of numerical aperture. Likewise, the VSI technique may be used to measure either polished surfaces or rough surfaces with nanometric vertical repeatability for all values of numerical aperture. In addition, with the VSI technique the vertical measurement range is intrinsically unlimited and very high scanning speeds (up to 100 µm/s) may be used.

The profilometer of the invention is equipped with a computer system that manages the programs of the modes of functioning described above, with results displayed on a monitor in the form of text, images or graphs. The data displayed are, for example, isometric, contour or profile representations, histograms, fast Fourier transforms (FFTs), etc., of the topography being measured, as well as standard microscope, confocal and interferometric images of the surface of the sample.

The software is designed to determine the geometric parameters of the surface being analysed (height, width, inclination, volume) along with the parameters of analysis (roughness, waviness, etc.), and can carry out filtering of data or functions of interpolation to restore unmeasured points. The software is also designed to export data either in text form or as binary files and allows printing of reports.

The measurement apparatus based on the dual technology optical profilometer of the invention can be completed with system for positioning samples, comprising two steps of X-Y movement in the plane perpendicular to the optical axis of the profilometer. These steps can be controlled manually or they can be motor-driven. In this case, the software of the profilometer itself allows positioning of the area of the sample to be measured within the field of view of the lens in use by means of joysticks and also allows automatic topographic measurement of profiles or topographies extending beyond the field of view of the lens, by means of the field stitching technique. The measurement apparatus can also be completed with a tip-tilt stage, needed for use of the PSI and VSI interferometric techniques to minimise the number of interference fringes appearing in the field of view.

BRIEF DESCRIPTION OF THE DRAWINGS

The FIGURE is a side elevational view of the dual technology optical profilometer in accordance with the present invention.

DETAILED DESCRIPTION OF THE EXEMPLARY EMBODIMENTS

The following is a description of an embodiment of a dual technology optical profilometer for three-dimensional inspection and measurement of surfaces. The features and advantages of the profilometer of the present invention will be clearer. The description will be given hereinafter by way of a non limitative example with reference to the drawing that is herein attached in the present specification, which corresponds to a diagrammatic general view of an optical profiler according to the invention.

The dual technology optical profilometer shown by way of an example in the drawing which is enclosed in the present specification has been generally designated at (1).

The dual technology optical profilometer (1) illustrated comprises basically a light source (2) made up of a high-power light emitting diode with a wavelength of 480 nm and a Lambert emission pattern. The spectrum of light emitted by this light-emitting diode (2) has a coherence length ranging from 2 to 10 µm, preferably from 4 to 6 µm, to allow application of both the phase shift interferometric profilometry technique (PSI) and the vertical scanning with white light profilometry technique (VSI).

The optical profilometer (1) also includes beam splitters (3, 4), one of which is a polarising beam splitter (3) associated with a micro-display (5).

There are three microscope lenses (6, 7, 8) mounted on a rotating support (9), allowing them to be interchanged easily, depending on the functional mode of the profilometer (1) that the user wishes to use. The microscope lenses (6, 7, 8) are conventional lenses that may be used to obtain confocal images and interferometric lenses that may be used to obtain interferometric images.

Said micro-display (5) forms part of the illumination pattern generating means. In the embodiment illustrated, said micro-display (5) is a ferroelectric liquid crystal on silicon (F-LCOS) micro-display adapted to generate a sequence of illumination patterns. This sequence of illumination patterns is such that it allows either confocal images to be obtained or total opening of all illumination pixels to obtain interferometric images, so that the profilometer (1) can function either in a confocal mode or an interferometric mode, as needed.

Auxiliary optical systems (14, 15) are also included acting in combination with the microscope lenses (6, 7, 8) so that the image in the plane of said LCOS micro-display (5) is projected on the surface of the sample (11) which, in turn, is projected on the CCD device (12).

In the confocal mode, the active microscope lens (8) is a conventional microscope lens, and an acquisition program associated with that functional mode is also activated. Said light source (LED) (2) emits a modulated beam of light that is collimated by means of a collimator (10) before it reaches the polarising beam splitter (PBS) (3). The part of the beam of light reflected by the PBS (3) falls upon the LCOS microdisplay (5) and is reflected by it with a polarisation that depends on the state assigned to each pixel for each illumination pattern represented. The beam reflected by the LCOS (5) once again passes through the PBS (3) and an optical system (15) and is reflected by the beam splitter (4) to the microscope lens (8), as shown in FIG. 1. The beam of light falls upon the surface of the sample to be measured (11), upon which the light pattern generated by the LCOS is projected (5). The light reflected or diffused on the surface of the sample passes once again through the microscope lens (8), the beam splitter (4) and an auxiliary optical system (field lens) (14), to fall upon the CCD device (12) of the profilometer.

The surface of the sample is illuminated by means of the LCOS micro-display (5) with a series of illumination patterns and the appropriate algorithm is used to obtain the value of the axial response for all the points falling within the field of view, in other words the confocal image of the plane of focus. These confocal images provide very high contrast, since light is only perceived in the areas near the focus, while the areas at a distance from the focus appear as dark.

Measurement of the topography of the surface is achieved through vertical scanning of the sample (11) by means of a vertical scanning system (13), thus obtaining a sequence of confocal images on different planes of the sample (11) located at differing heights. On the basis of these images, and by means of the appropriate software, a three-dimensional reconstruction of the surface of the sample (11) is obtained. For each point of the surface being analysed (11), said software determines the value of the topographic co-ordinate at the position for which the maximum axial response is obtained.

The vertical scanning system (13) may comprise a motor-driven means or a piezoelectric-driven means (PZT). Both systems (motor or piezoelectric-driven means) may be controlled by means of open loop or preferably closed loop systems.

In the mode described, lenses with a large numerical aperture (NA) may be used, allowing measurement of polished surfaces with very high slopes (up to 70°), as well as lenses with super-large working distances (SLWD), allowing measurement of surfaces with high aspect ratio. In all cases, structured samples containing dissimilar materials can also be measured.

In the interferometric mode, the active microscope lens (8) is an interferometric microscope lens, and the acquisition program associated with the lens is also activated. In this case, the micro-display (5) has all its pixels open to illuminate the whole surface to be analysed (11) at once. Here, illumination patterns are not projected, but instead the whole surface (11) is illuminated to obtain interferometric images for each plane of analysis. The beam emitted is passed through the splitter (4), which sends the beam of light to the surface of the sample (11), and the reflection of the surface falls upon the CCD device (12). The series of interferometric images resulting from the vertical scanning of the sample provides, by means of the appropriate algorithm, the surface topography of the sample being analysed.

The profilometer of the invention is provided with a computer system that manages the programs of the modes of functioning described above, with results displayed on a monitor in the form of text, images or graphs. The data displayed are, for example, isometric, contour or profile representations, histograms, fast Fourier transforms (FFTs), etc., of the topography being measured, as well as standard microscope, confocal and interferometric images of the surface of the sample.

Once having been sufficiently described what the dual (confocal and interferometric) technology optical profilometer of the present invention consists in accordance to the enclosed drawings, it is understood that any detail modification can be introduced as appropriate, unless variations may alter the essence of the invention as summarised in the appended claims.

What is claimed is:

1. A dual technology optical profilometer comprising
a light source,
beam splitters and
a series of microscope lenses, said microscope lenses being interchangeable, said microscope lenses including first conventional lenses to obtain confocal images of the surface of a sample and second interferometric lenses to obtain interferometric images of the surface of the sample,
said dual technology optical profilometer further comprising illumination pattern generating means that comprises a LCOS micro-display which, when using the first conventional lenses to obtain confocal images, generates a sequence of illumination patterns that provides the confocal images, and, when using the second interferometric lenses to obtain interferometric images, allows all illumination pixels in the LCOS micro-display to be open to obtain the interferometric images.

2. A dual technology optical profilometer as claimed in claim 1, wherein said light source is a light-emitting diode.

3. A dual technology optical profilometer as claimed in claim 1 wherein, at least one of the beam splitters is a polarizing beam splitter associated with said micro-display.

4. A dual technology optical profilometer as claimed in claim 2, wherein, said light-emitting diode emits a spectrum of light with a coherence length ranging from 2 to 10 μm, thereby allowing application of both the phase shift interferometric profilometry (PSI) technique and the vertical scanning with white light profilometry (VSI) technique.

5. A dual technology optical profilometer as claimed in claim 1, further comprising, a vertical scanning system of the sample, for obtaining a series of confocal or interferometric images in different planes of the sample located at different heights from which, by using the appropriate algorithms, the surface topography of said sample is obtained.

6. A dual technology optical profilometer as claimed in claim 5, wherein, said vertical scanning system of the sample includes a motor-driven means.

7. A dual technology optical profilometer as claimed in claim 5, wherein said vertical scanning system of the sample includes a piezoelectric-driven means (PZT).

8. A dual technology optical profilometer as claimed in claim 6 wherein said scanning system is controlled by means of an open loop or closed loop system.

9. A dual technology optical profilometer as claimed in claim 1, wherein said LCOS micro-display generates the sequence of illumination patterns that provides, by means of the application of suitable algorithms, the confocal images.

* * * * *